(12) United States Patent
Choi

(10) Patent No.: US 8,896,174 B2
(45) Date of Patent: Nov. 25, 2014

(54) ACTIVE MAGNETIC BEARING

(75) Inventor: Sang-Hyun Choi, Seoul (KR)

(73) Assignee: Foshan Genesis Amb Tech Co., Ltd., Foshan (CN)

(*) Notice: Subject to any disclaimer, the term of this patent is extended or adjusted under 35 U.S.C. 154(b) by 267 days.

(21) Appl. No.: 13/582,508

(22) PCT Filed: Mar. 2, 2011

(86) PCT No.: PCT/KR2011/001432
§ 371 (c)(1),
(2), (4) Date: Oct. 9, 2012

(87) PCT Pub. No.: WO2011/108842
PCT Pub. Date: Sep. 9, 2011

(65) Prior Publication Data
US 2013/0038157 A1    Feb. 14, 2013

(30) Foreign Application Priority Data
Mar. 3, 2010    (KR) .................. 10-2010-0018763

(51) Int. Cl.
*H02K 7/09*    (2006.01)
*F16C 32/04*    (2006.01)

(52) U.S. Cl.
CPC .............. *F16C 32/047* (2013.01); *F16C 32/048* (2013.01); *F16C 32/0446* (2013.01); *F16C 32/0461* (2013.01)
USPC ........................................ 310/90.5; 310/68 B

(58) Field of Classification Search
USPC .............................................. 310/90.5, 68 B
See application file for complete search history.

(56) References Cited

U.S. PATENT DOCUMENTS

| | | | | |
|---|---|---|---|---|
| 5,748,005 | A * | 5/1998 | McCormick et al. | 324/662 |
| 6,114,788 | A * | 9/2000 | Vuillemin (Muller) et al. | 310/90.5 |
| 6,288,465 | B1 * | 9/2001 | Suzuki et al. | 310/90.5 |
| 6,310,414 | B1 * | 10/2001 | Agahi et al. | 310/40.5 |
| 6,373,156 | B2 * | 4/2002 | Suzuki et al. | 310/68 B |
| 6,822,775 | B2 * | 11/2004 | Suzuki et al. | 359/200.4 |
| 7,780,357 | B2 * | 8/2010 | Varonis | 384/448 |
| 7,932,656 | B2 * | 4/2011 | Ozaki et al. | 310/90.5 |
| 2008/0185928 | A1 * | 8/2008 | Buhler et al. | 310/90.5 |
| 2009/0127956 | A1 * | 5/2009 | Ozaki et al. | 310/90.5 |
| 2011/0127868 | A1 * | 6/2011 | Miller et al. | 310/90.5 |

* cited by examiner

*Primary Examiner* — Thanh Lam
(74) *Attorney, Agent, or Firm* — Lexyoume IP Meister, PLLC

(57) ABSTRACT

An active magnetic bearing includes a bearing housing, a bearing stator, a bearing armature, a position detector, a jacket, and a stress buffering member. The bearing stator is accommodated in the bearing housing to support rotation of a rotor by using a magnetic force. The bearing armature is disposed to be spaced apart from the bearing stator by an interval and fixed to the rotor. The position detector is installed in the bearing housing to detect a position of the rotor. The jacket is interposed between the bearing stator and the bearing armature to seal a space between the bearing stator and the bearing housing. The stress buffering member connected to opposite ends of the jacket and the bearing housing, to buffer a stress generated due to differences between thermal exposition coefficients and temperatures of the bearing housing and the jacket.

8 Claims, 4 Drawing Sheets

ACTIVE MAGNETIC BEARING

TECHNICAL FIELD

The present invention relates to an active magnetic bearing, and more particularly, to an active magnetic bearing which supports rotation of a rotor by using a magnetic force.

BACKGROUND ART

In general, a rotary device such as a motor having a rotary shaft employs a bearing for supporting the rotary shaft. Such a bearing includes a ball bearing, an air bearing, a fluid bearing, a magnetic bearing, and the like.

A magnetic bearing supports rotation of a rotary shaft by using a magnetic force. Thus, the magnetic bearing includes an electromagnet for generating a magnetic force, and a sensor for detecting a position of the rotary shaft floated by the magnetic force generated in the electromagnet.

Further, a potting compound is filled in a space between a bearing housing and the electromagnet to reinforce a mechanical strength of the electromagnet. When contaminations of the electromagnet and the sensor due to chemical materials and the like may be problematic, the space needs to be sealed, in which case an interior of the bearing may be sealed by using a jacket.

Here, when the bearing is exposed to a high temperature or lower temperature environment, a strong stress may be applied to the jacket due to differences between thermal expansion coefficients and temperatures of the bearing housing and the jacket.

An existing general jacket does not have a structure for buffering a stress, and thus the jacket may be subjected to a crack or may be even damaged or leaked.

DISCLOSURE

Technical Problem

The present invention provides an active magnetic bearing having a structure for buffering a stress generated due to differences between thermal expansion coefficients and temperatures of a bearing housing and a jacket.

Technical Solution

According to an aspect of the present invention, there is provided an active magnetic bearing including: a bearing housing; a bearing stator accommodated in the bearing housing to support rotation of a rotor by using a magnetic force; a bearing armature disposed to be spaced apart from the bearing stator by an interval and fixed to the rotor; a position detector installed in the bearing housing to detect a position of the rotor; a jacket interposed between the bearing stator and the bearing armature to seal a space between the bearing stator and the bearing housing; and a stress buffering member connected to opposite ends of the jacket and the bearing housing, to buffer a stress generated due to differences between thermal exposition coefficients and temperatures of the bearing housing and the jacket.

According to an embodiment of the present invention, the stress buffering member may include a bellows having a shape curved along an axial direction of the jacket.

According to another embodiment of the present invention, the jacket may have a flow path of a lubricant. In this case, the jacket supplementarily serves as a touch down bearing necessary for a magnetically suspended bearing, and if necessary, serves as an auxiliary bearing for generating a repulsive force due to a fluid pressure or a contact.

According to still another embodiment of the present invention, the jacket may include: a central portion fixed to the bearing stator; and a peripheral portion extending from the central portion and to which the stress buffering member is connected.

According to yet another embodiment of the present invention, the bearing stator may include: a yoke interposed between the bearing housing and the jacket; and an electromagnet installed in the yoke. A pair of electromagnets may be provided to generate a moment for self-aligning rotation of the jacket.

According to a further embodiment of the present invention, the active magnetic bearing may further include an electronic control unit for controlling the position detector and the bearing stator.

According to another aspect of the present invention, there is provided an active magnetic bearing including: a bearing housing; a yoke accommodated in the bearing housing; an electronic magnet installed in the yoke to support rotation of a rotor by using a magnetic force; a bearing armature disposed to be spaced apart from the electromagnet by an interval and fixed to the rotor; a position detector installed in the bearing housing to detect a position of the rotor; a jacket interposed between the bearing stator and the bearing armature to seal a space between the bearing stator and the bearing housing; a bellows connected to opposite ends of the jacket and the bearing housing, to buffer a stress generated due to differences between thermal exposition coefficients and temperatures of the bearing housing and the jacket; and an electronic control unit for controlling the position detector and the electromagnet.

Advantageous Effects

According to the present invention, a jacket has a stress buffering member, and thus a stress generated due to differences between thermal expansion coefficients and temperatures of a jacket and a bearing housing can be buffered by a stress buffering member. Thus, the stress applied to the jacket can be reduced, and thus a sealing structure of the jacket can be reinforced.

DESCRIPTION OF REFERENCE NUMERALS

Figure 1:
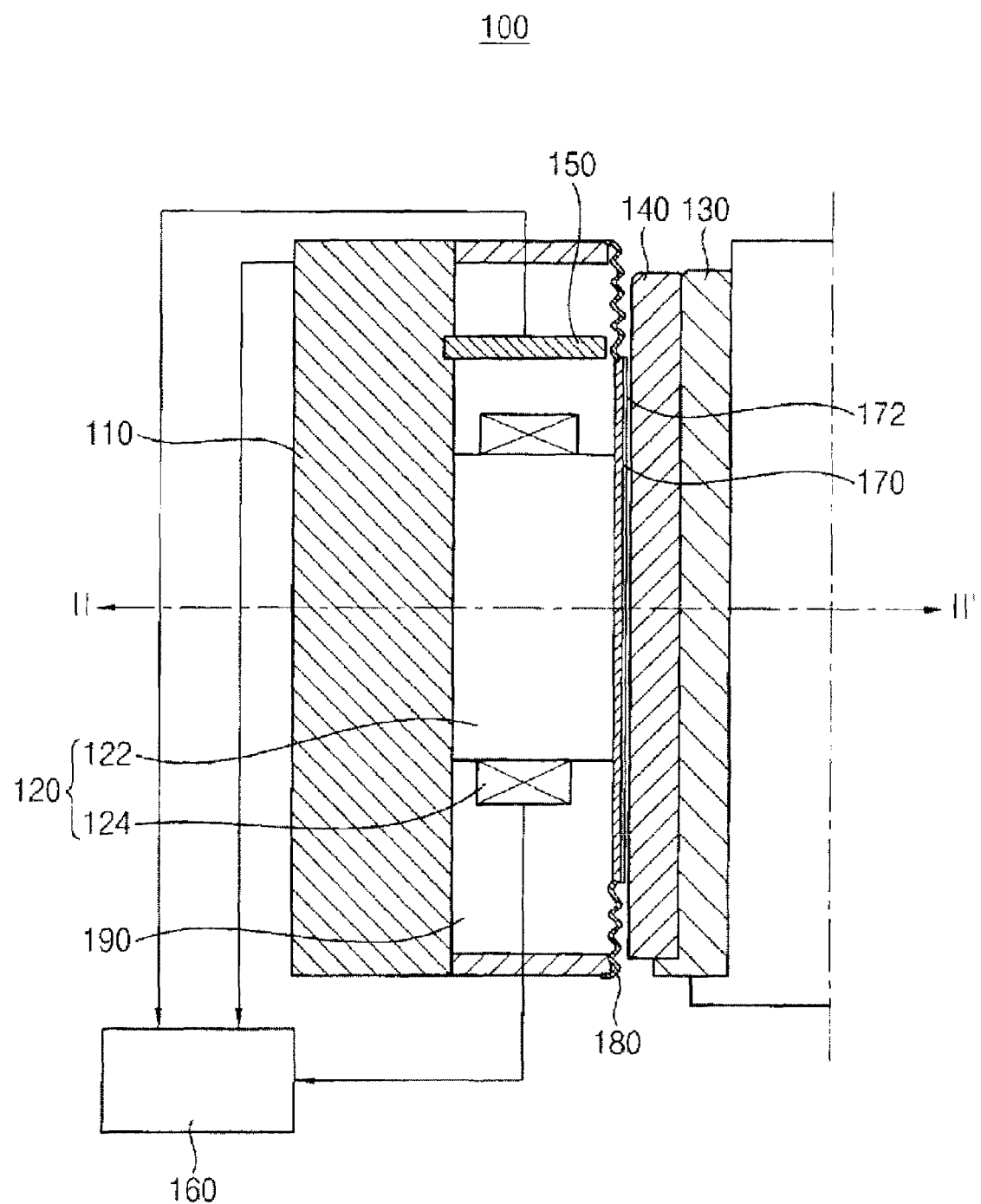
FIG. 1 is a cross-sectional view illustrating an active magnetic bearing according to an embodiment of the present invention.

| | |
|---|---|
| 110: Bearing housing | 120: Bearing stator |
| 130: Rotor | 140: Bearing armature |
| 150: Position detector | 160: Electronic control unit |
| 170: Jacket | 180: Stress buffering member |

BEST MODE

Mode for Invention

Hereinafter, exemplary embodiments of the present invention will be described in more detail with reference to the accompanying drawings. The present invention may be variously modified and realized in various forms, and thus specific embodiments will be exemplified in the drawings and described in detail hereinbelow. However, the present invention is not limited to the specific disclosed forms, and needs to be construed to include all modifications, equivalents, or replacements included in the spirit and technical range of the present invention. In the description of the drawings, like reference numerals are used to denote like constituent elements. In the accompanying drawings, the sizes of the structures are larger than the actual sizes to clearly describe the present invention. The terms such as first and second may be used to describe various constituent elements, but the elements should not be limited by the terms. The terms are used only for the purpose of distinguishing one element from another element. For example, a first element may be named a second element without departing from the scope of the present invention, and a second element may be named a first element in a similar way. A singular expression includes a plural expression as long as they are clearly distinguished in the context.

In the application, it should be understood that the terms such as "comprising", "including" are intended to express that features, numbers, steps, operations, constituent elements, part, or combinations thereof described in the specification are present and do not exclude existence or additions of one or more other features, numbers, steps, operations, constituent elements, part, or combinations thereof. Further, when a first part such as a layer, a film, a region, or a plate is on a second part, the second part may be not only directly on the first part but a third part may intervene between them. To the contrary, a first part such as a layer, a film, a region, or a plate is under a second part, the second part may be not only directly under the first part but a third part may intervene between them.

Figure 2:
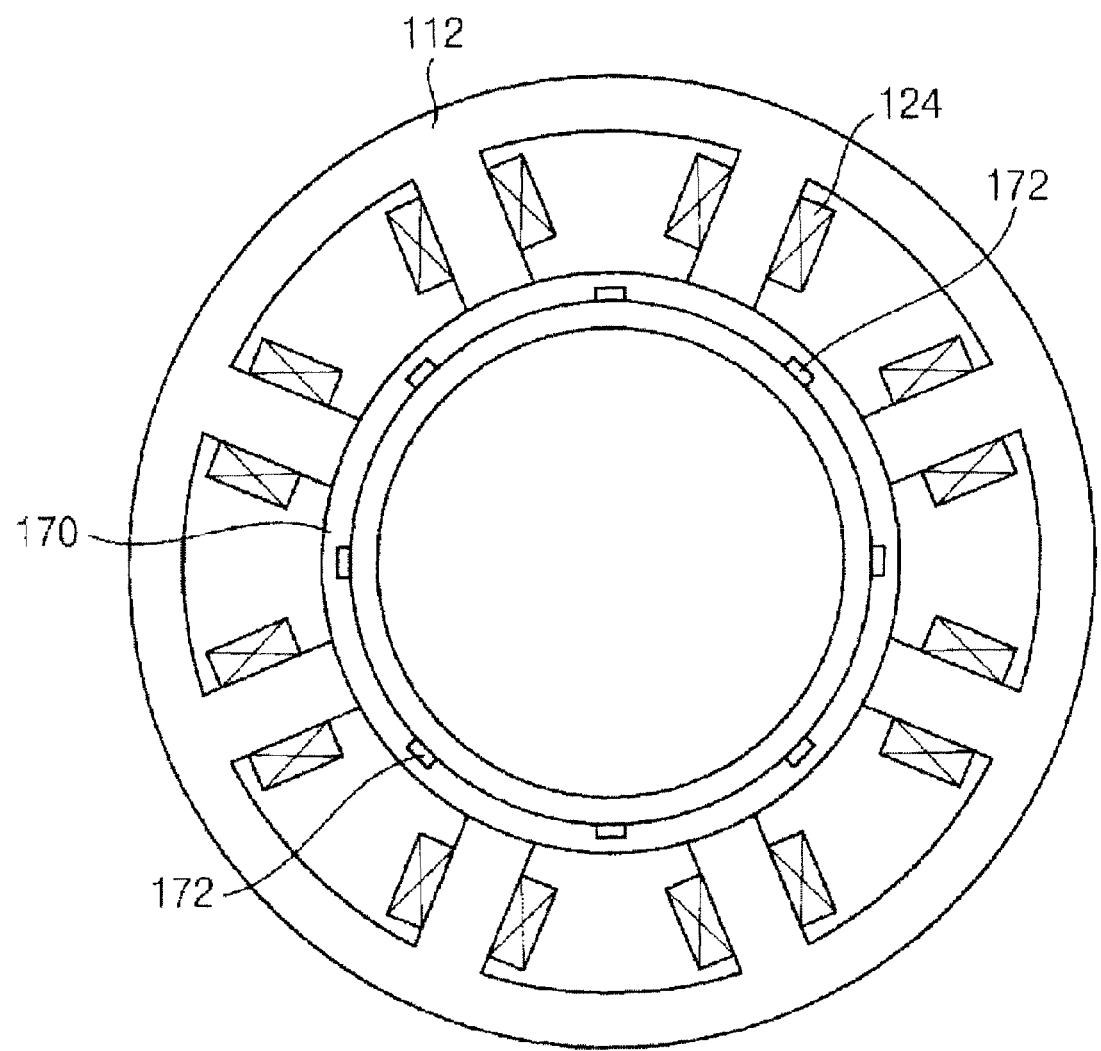
FIG. 2 is a cross-sectional view taken along line II-II' of FIG. 1.
Figure 3:
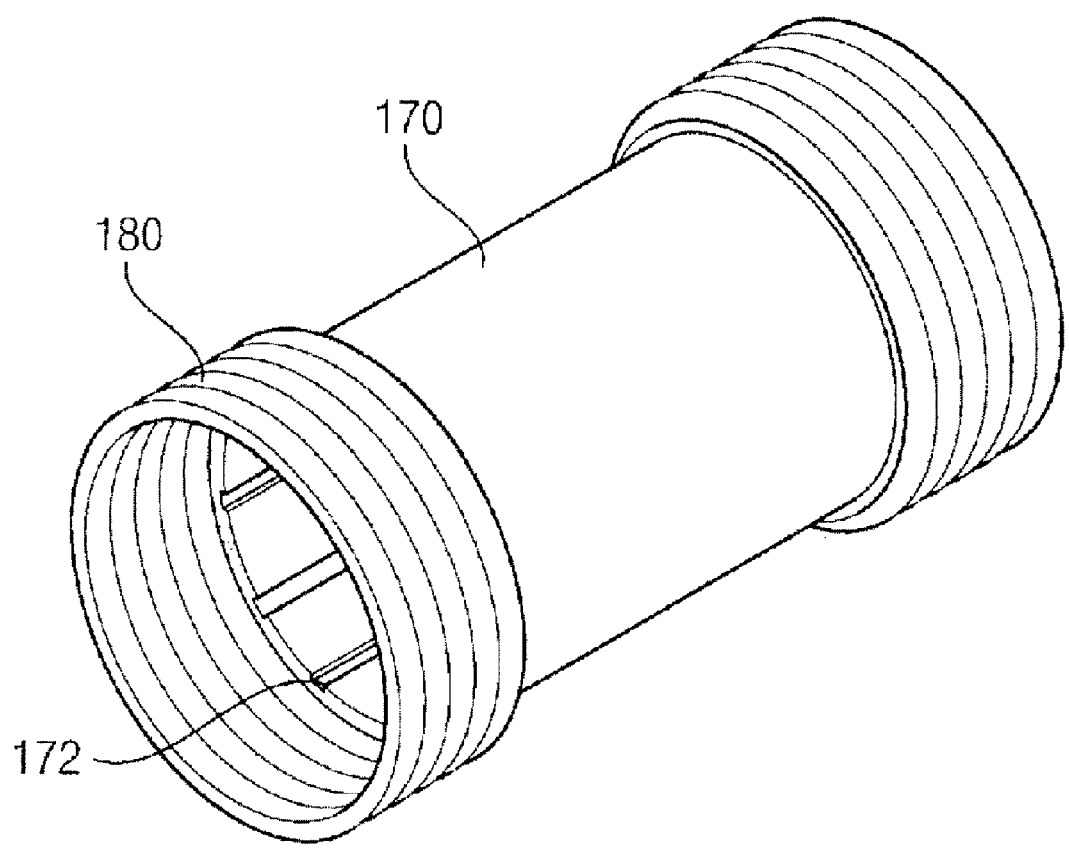
FIG. 3 is an enlarged perspective view illustrating a jacket and a stress buffering member of the active magnetic bearing of FIG. 1.

FIG. 1 is a cross-sectional view illustrating an active magnetic bearing according to an embodiment of the present invention. FIG. 2 is a cross-sectional view taken along line II-II' of FIG. 1. FIG. 3 is an enlarged perspective view illustrating a jacket and a stress buffering member of the active magnetic bearing of FIG. 1.

Referring to FIGS. 1 to 3, the active magnetic bearing 100 according to the present embodiment includes a bearing housing 100, a bearing stator 120, a bearing armature 140, a position detector 150, an electronic control unit 160, a jacket 170, and a stress buffering member 180.

The bearing housing 110 has a cylindrical shape opposite side surfaces of which are blocked. Thus, the bearing housing 110 has a substantially cylindrical interior space.

The bearing stator 120 is accommodated in the interior space of the bearing housing 110. The bearing stator 120 includes a yoke 122 accommodated in the interior space of the bearing housing 110, and an electromagnet 124 installed in the yoke 122. Rotation of a rotor 130, which is a rotary body of a rotary device, is supported by a magnetic field generated by the electromagnet 124.

The bearing armature 140 is disposed to face the bearing stator 120. In the present embodiment, the bearing armature 140 is disposed to be spaced apart from the bearing stator 120 by a minute interval. The bearing armature 140 is coupled to the rotor 130.

The position detector 150 detects a position of the rotor 130 floated by a magnetic force. The position detector 150 is installed in the bearing housing 110.

The electronic control unit 160 is electrically connected to the electromagnet 124 of the position detector 150 to control operations of the position detector 150 and the electromagnet 124.

The jacket 170 is interposed between the bearing stator 120 and the bearing armature 140. In the present embodiment, the jacket 170 is fixed to the yoke 122 and the bearing housing 110 to isolate the interior space of the bearing housing 110 from the outside. The jacket 170 generally is a nonmagnetic body, and may partially contain a magnetic material to increase a magnetic force of the electromagnet.

In the present embodiment, the jacket has a cylindrical shape having a small thickness. A flow passage 172 of a lubricant is formed in the jacket 170 so that the jacket 170 having the shape supplementarily serves as a fluid lubricating bearing. In detail, the flow passage 172 may be formed along an axial direction of the jacket on an inner side surface of the jacket 170 contacting the bearing armature 140.

The stress buffering member 180 is connected between opposite ends of the jacket 170 and the bearing housing 110. The stress buffering member 180 functions to buffer a stress generated due to differences between thermal expansion coefficients and temperatures of the jacket 170 and the bearing housing 110. That is, the stress buffering member 180 restrains a stress from being applied to the jacket 170 to prevent damage to or breakdown of the jacket 170. In the present embodiment, the stress buffering member 180 may have a curved shape formed along the axial direction of the jacket 170. For example, the stress buffering member 180 may have a bellows shape.

A potting compound 180 is filled in an interior space defined by the bearing housing 110, the bearing stator 120, and the jacket 170. The potting compound 180 serves to reinforce a coupling strength with the electromagnet 124.

According to the present embodiment, a stress generated due to differences between thermal expansion coefficients and temperatures of the jacket and the bearing housing is buffered by the stress buffering member. Thus, the stress applied to the jacket is reduced, and thus a sealing structure of the jacket can be reinforced.

Figure 4:
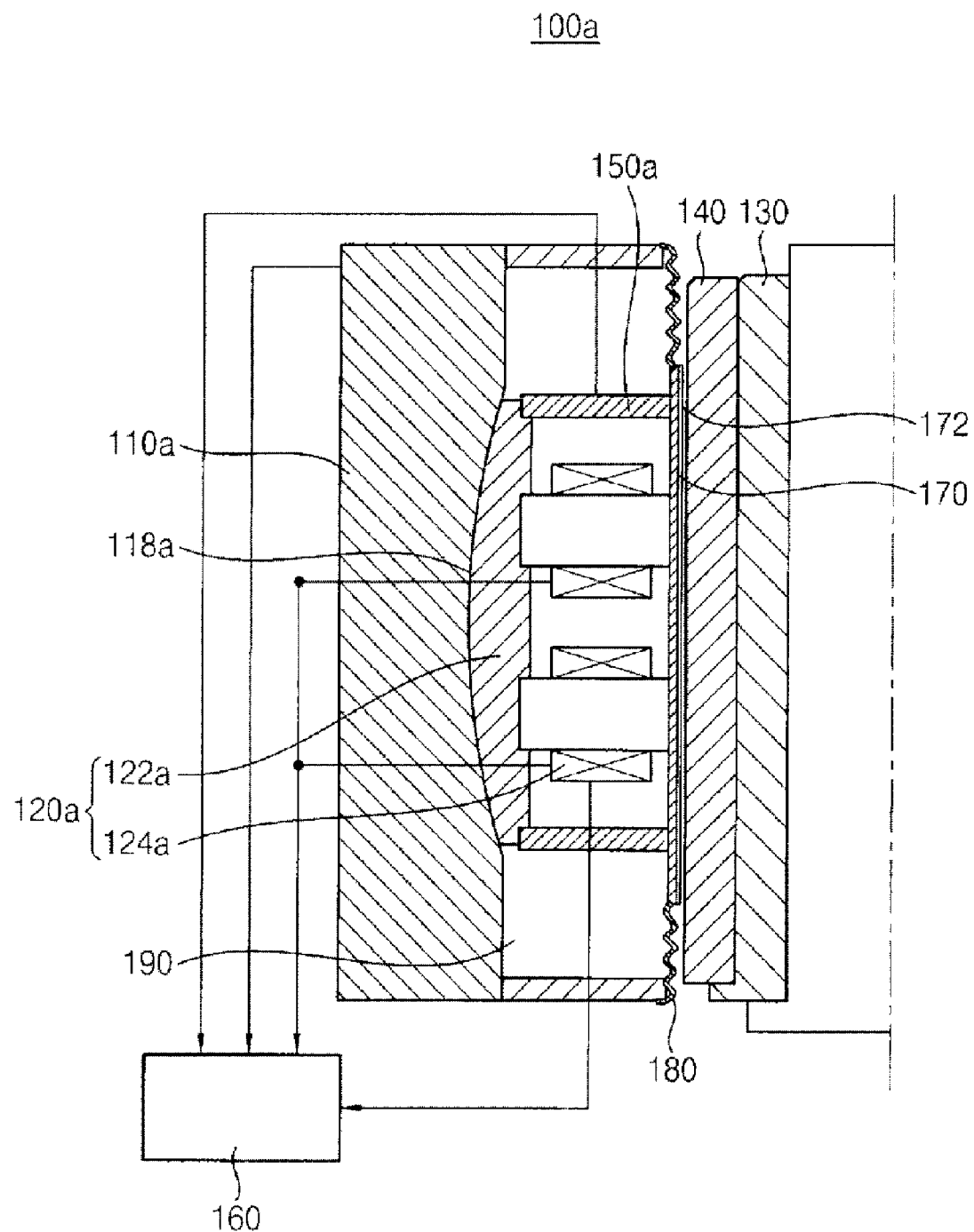
FIG. 4 is a cross-sectional view illustrating an active magnetic bearing according to another embodiment of the present invention.

FIG. 4 is a cross-sectional view illustrating an active magnetic bearing according to another embodiment of the present invention.

The active magnetic bearing 100a according to the present embodiment includes substantially the same constituent elements as the active magnetic bearing illustrated in FIG. 1 except for a bearing housing and a bearing stator. Thus, the same elements are denoted by the same reference numerals, and the repeated description of the same elements is omitted.

Referring to FIG. 4, the bearing housing 100a of the active magnetic bearing 100a according to the present embodiment has a rounded portion 118a. The rounded portion 118a is radially formed on an inner side surface of the bearing housing 110a contacting the bearing stator 120a.

The bearing stator 120a includes a yoke 122a accommodated in an interior space of the bearing housing 110a, and two electromagnets 124a installed in the yoke 122a. The yoke 122a contacts the rounded portion 118a of the bearing housing 110a. The yoke 122a contacts the rounded portion 118a of the bearing housing 110a. Thus, the yoke 122a has a convex shape which is convex toward a radial direction having a curvature corresponding to a curvature of the rounded portion 118a.

A moment is required to allow a self-aligning rotation of the jacket 170. Thus, the two electromagnets 124*a* are installed in the flanges of the yoke 122*a*, respectively. The two electromagnets 124*a* are separately controlled by the electronic control unit 160, and a difference occurs between the electromagnetic forces generated in the electromagnets 124*a*. Thus, a moment may be generated to allow a self-aligning rotation of the jacket 170 by a difference between electric forces.

In addition, since the number of electromagnets 124*a* is two, a pair of position detectors 150*a* for controlling operations of the electromagnets 124*a* is attached to the yoke 122*a* to surround the electromagnets 124*a*.

While the present invention has been described with reference to the exemplary embodiments until now, it will be understood by those skilled in the art to which the present invention pertains that the present invention may be variously modified and changed without departing from the sprit and scope of the present invention described in the claims.

The invention claimed is:

1. An active magnetic bearing comprising:
   a bearing housing;
   a bearing stator accommodated in the bearing housing to support rotation of a rotor by using a magnetic force;
   a bearing armature disposed to be spaced apart from the bearing stator by an interval and fixed to the rotor;
   a position detector installed in the bearing housing to detect a position of the rotor;
   a jacket interposed between the bearing stator and the bearing armature to seal a space between the bearing stator and the bearing housing; and
   a stress buffering member connected to opposite ends of the jacket and the bearing housing, to buffer a stress generated due to differences between thermal exposition coefficients and temperatures of the bearing housing and the jacket.

2. The active magnetic bearing of claim 1, wherein the stress buffering member includes a bellows having a shape curved along an axial direction of the jacket.

3. The active magnetic bearing of claim 1, wherein the jacket has a flow path of a lubricant.

4. The active magnetic bearing of claim 1, wherein the jacket includes:
   a central portion fixed to the bearing stator; and
   a peripheral portion extending from the central portion and to which the stress buffering member is connected.

5. The active magnetic bearing of claim 1, wherein the bearing stator includes:
   a yoke interposed between the bearing housing and the jacket; and
   an electromagnet installed in the yoke.

6. The active magnetic bearing of claim 5, wherein an pair of electromagnets are provided to generate a moment for self-aligning rotation of the jacket.

7. The active magnetic bearing of claim 1, further comprising an electronic control unit for controlling the position detector and the bearing stator.

8. An active magnetic bearing comprising:
   a bearing housing;
   a yoke accommodated in the bearing housing;
   an electronic magnet installed in the yoke to support rotation of a rotor by using a magnetic force;
   a bearing armature disposed to be spaced apart from the electromagnet by an interval and fixed to the rotor;
   a position detector installed in the bearing housing to detect a position of the rotor;
   a jacket interposed between the bearing stator and the bearing armature to seal a space between the bearing stator and the bearing housing;
   a bellows connected to opposite ends of the jacket and the bearing housing, to buffer a stress generated due to differences between thermal exposition coefficients and temperatures of the bearing housing and the jacket; and
   an electronic control unit for controlling the position detector and the electromagnet.

* * * * *